3,248,424
PROCESS FOR THE PRODUCTION OF AMINO UREAS

Erwin Müller and Otto Bayer, Leverkusen, Germany, assignors to Farbenfabriken Bayer Aktiengesellschaft, Leverkusen, Germany, a German corporation
No Drawing. Filed June 19, 1961, Ser. No. 117,848
Claims priority, application Germany, July 5, 1960, F 31,583
3 Claims. (Cl. 260—553)

It is known to produce high molecular weight polyureas from diisocyanates and diamines. On the other hand, if an attempt is made to produce low molecular weight amino ureas having terminal amino groups by the same method, a mixture of relatively high and low molecular weight polyureas is obtained, even if 1 mol of diisocyanate is reacted with 2 mols of diamine. It is not possible to obtain a pure amino urea of the general formula

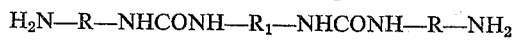

$H_2N—R—NHCONH—R_1—NHCONH—R—NH_2$ wherein R and $R_1$ are organic radicals, by this method, even if the reaction is carried out extremely carefully at low temperatures.

It is therefore an object of this invention to provide a method for making low molecular weight amino ureas having terminal amino groups.

The present invention makes it possible to prepare liquid or highly viscous low molecular weight amino ureas from polyvalent isocyanates and diamines. In the process according to the present invention a polyvalent isocyanate is reacted in alcoholic solution and at a temperature of from —20° C. to +30° C. with 1 mol per —NCO group of a diamine containing either (a) one primary and one secondary amino group or (b) one amino group linked to an aliphatic or cycloaliphatic radical and one amino group linked to an aromatic radical or (c) two amino groups linked to an aromatic radical, one of which groups has an additional substituent in the o-position.

Any suitable diamine having the foregoing characteristics may be used such as, for example, N-methyl-1,3-propylene diamine, p-aminobenzylamine, 3-chloro-4-aminobenzylamine, hexahydrobenzidine, hexahydro-4,4'-diaminodiphenylmethane, 2,6-dichloro-1,4 - diaminobenzene, 2,6-diethyl-1,4-phenylenediamine, 2-chloro-phenylene - 1,4 - diamine, 2,6 - diethyl - 1,4 - phenylenediamine, 2-chloro-phenylene-1,4-diamine, N-ethyl - 1,4 - butylenediamine, N - methyl - hexamethylenediamine, N - β - hydroethyl-ethylenediamine, hexahydro-4,4' - diaminodiphenyldimethyl methane.

The characteristic feature of the diamines employed in the process according to the present invention is that the two amino groups in the diamine molecule react at different rates with —NCO groups. When a polyvalent diisocyanate is reacted with a simple diamine the product is a cross-linked high molecular weight polyurea. In this case the speed of reaction of the amino groups with the isocyanate groups is very high. On the other hand, the desired amino ureas of low molecular weight and which are liquid or at least viscous and soluble, are obtained by the use of the aforementioned diamines under the conditions according to the invention, involving the reaction in alcohol at low temperatures. Addition compounds are formed with heat of reaction on mixing the diamines with alcohols and these compounds show a reduced reactivity with respect to isocyanates. Consequently, under the conditions employed in the process according to the present invention only the more reactive amino group of the diamine reacts with an —NCO group with formation of urea, while the less reactive amino group remains. Under the conditions described, the diamines react as it were mono-functionally and consequently make possible the production of low molecular weight polyamines which contain one urea group for each amino group.

The number of amino groups per molecule in the amino urea product depends on the number of —NCO groups in the polyvalent isocyanate reactant. One urea group and one amino group are formed per —NCO group.

Suitable polyvalent diisocyanates for employment in the process according to the present invention are: tetramethylene - diisocyanate, hexamethylene diisocyanate, 1,4-cyclohexylene diisocyanate, toluylene diisocyanate, p-phenylene diisocyanate, 4,4'-diphenyl methane diisocyanate, tris-(p-isocyanatophenyl)-thiophosphate, chloro-p-phenylene diisocyanate, 3-nitro-diphenylene-4,4'-diisocyanate, methoxy-p-phenylene diisocyanate, m-phenylene diisocyanate, 1,5-naphthylene diisocyanate, 1,3 - cyclohexylene diisocyanate, diphenylcarbonate - 4,4' - diisocyanate, 1-isopropylbenzene-2,4-diisocyanate, diphenylether-4,4'-diisocyanate, biphenylene-4,4'-diisocyanate.

The molecular weight of the amino ureas which are obtained by the process according to the present invention is largely determined by the molecular weight of the polyvalent diisocyanate. This is of particular interest when addition products of polyisocyanates and polyhydroxy compounds having a molecular weight of up to 3000 are employed as polyvalent isocyanate. Examples of such addition products are the reaction products of 1 mol of trimethylol propane and 3 mols of toluylene diisocyanate and those products containing free —NCO groups which are obtained by reacting an isocyanate with a polyether, a polythioether, a polyisocyanate or a polyester. These products containing free —NCO groups may have molecular weights of up to 3000; those products having a molecular weight of from 400 to 2000 being particularly preferred.

The components are reacted in alcoholic solution at a temperature of from —20° C. to +30° C. and preferably at a temperature of from —5° C. to +10° C.

Suitable alcoholic solvents are, inter alia, methanol, ethanol, isopropanol, t-butanol, glycol, glycol monomethyl ether and tetrahydrofuran carbinol.

In carrying out the process according to the present invention, the polyvalent isocyanate, cooled to 0 to 5° C., may be slowly introduced and while stirring well into the alcoholic solution of the diamine cooled to —5 to 0° C. The ratios of the reactants are so chosen that at least one mol of the diamine is used for each —NCO group. Consequently, it is possible to work with an excess of the diamine reactant.

The products obtained by the process according to the present invention are more or less viscous liquids. They have various uses in connection with the production of plastics. They can, for example, be used for cross-linking polyepoxy compounds and water-soluble polyamines having a polyethylene oxide base and which are used for textile finishing.

Example 1

Production of the starting material:

84 g. of hexamethylene diisocyanate were incorporated into 500 g. of a dehydrated polypropylene ether (molecular weight 2000; OH number 56) while stirring at 90° C. The mixture was heated at 130–140° C. for 1 hour with stirring. The addition product which was obtained had an —NCO content of 3.4%.

500 g. of the starting material thus prepared were cooled to 5° C. and gradually introduced, while stirring well, into a solution of 100 g. of N-methyl propylene diamine in 1 litre of ethanol cooled to —5° C. The temperature of the mixture was not allowed to rise above 0° C. during the addition of the starting material. Alcohol and excess diamine were evaporated off in vacuo three hours after completion of the reaction. The residue was a viscous light-colored oil which reacted with isocyanates at room temperature with cross-linking.

The product had an equivalent weight of 1120 as determined by titration with hydrochloric acid. The calculated equivalent weight is 1256.

Example 2

Production of the starting material:

500 g. of a dehydrated polypropylene ether (molecular weight 410; OH number 270) were incorporated with stirring into 410 g. of hexamethylene diisocyanate at 90° C. The mixture was heated at 130–140° C. for 1 hour. The addition product which formed had an —NCO content of 11.3%.

200 g. of the starting material thus prepared were cooled to 5° C. and slowly introduced while stirring well into a solution of 100 g. of N-methyl propylene diamine in 1 litre of ethanol cooled to —5° C. The temperature of the mixture was not allowed to rise above 0° C. during the addition of the starting material. Alcohol and excess diamine were evaporated off in vacuo three hours after completion of the reaction. The residue was a highly viscous oil which reacted with toluylene diisocyanate at room temperature.

Equivalent weight found: 435. Calc.: 461.

Example 3

500 g. of the starting material obtained as described in Example 1 and having an —NCO content of 3.4% were incorporated with stirring into a solution of 54 g. of p-aminobenzylamine in 1 litre of ethanol under the conditions described in Example 1. After evaporating off the excess alcohol and diamine in vacuo, a soft waxy product was obtained which reacted with isocyanates at room temperature.

Equivalent weight found: 1410. Calc.: 1309.

Example 4

168 g. of hexamethylene diisocyanate were introduced dropwise at —5 to 0° C. into a solution of 176 g. of N-methyl propylene diamine in 1.5 litres of ethanol. The temperature of the mixture was not allowed to rise above 0° C. during the addition of the hexamethylene diisocyanate. The product was concentrated by evaporation in vacuo three hours after completion of the reaction. A highly viscous oil was obtained which reacted with isocyanates.

Equivalent weight found: 305. Calc: 260.

Example 5

500 g. of an addition product having an —NCO content of 3.35% and which had been obtained by reacting 500 g. of polypropylene ether and 87 g. of toluylene-2,4-diisocyanate were introduced into a solution of 75 g. of N-methyl propylene diamine in 1 litre of ethanol under the conditions described in Example 1. After evaporating the alcohol, a viscous oil was obtained which reacted with isocyanates.

Equivalent weight found: 1225. Calc.: 1262.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:

1. A method for making liquid amino ureas having terminal amino groups which comprises reacting in an alcohol solution at a temperature of from about —20° C. to about +30° C. an organic polyisocyanate and a diamine having one primary and one secondary amino group in the proportion of one mol diamine per —NCO group of the polyisocyanate.

2. A method for making liquid amino ureas having terminal amino groups which comprises reacting in an alcohol solution at a temperature of from about —20° C. to about +30° C. an organic polyisocyanate and a diamine in the proportion of one mol diamine per —NCO group of the polyisocyanate, said diamine having one amino group attached to an aliphatic radical and one amino group attached to an aromatic radical.

3. A method for making liquid amino ureas having terminal amino groups which comprises reacting in an alcohol solution at a temperature of from about —20° C. to about +30° C. an organic polyisocyanate and a diamine in the proportion of one mol diamine per —NCO group of the polyisocyanate, said diamine having both of its amino groups attached to an aromatic radical, one of said amino groups being ortho to a substituent on the ring which effects the reactivity thereof with an —NCO group.

References Cited by the Examiner

UNITED STATES PATENTS 2,965,972  12/1960  Lott _____ 260—553
2,988,538   6/1961  Thomas et al. _____ 260—553

OTHER REFERENCES

Arnold et al.: J. Chem. Education, vol. 34, No. 4, April 1957, pp. 158–59.

Cram et al.: Organic Chemistry (1959), pp. 165–6.

Naegeli et al.: Helv. Chim. Acta, vol. 21 (1938), pp. 1127 to 1143.

Pinner: Plastics, London, vol. 11 (1947), pp. 208 to 210.

Stoutland et al.: J. Org. Chem., vol. 24 (1959), pp. 818–20.

NICHOLAS S. RIZZO, *Primary Examiner.*

D. M. McCUTCHEN, WALTER MODANCE, IRVING MARCUS, *Examiners.*